United States Patent
Manabe et al.

(10) Patent No.: US 10,262,125 B2
(45) Date of Patent: Apr. 16, 2019

(54) IMAGE SENSING SYSTEM

(71) Applicant: OMRON Corporation, Kyoto-shi, Kyoto (JP)

(72) Inventors: Seiichi Manabe, Kusatsu (JP); Tatsuya Murakami, Kusatsu (JP); Yanping Lu, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 14 days.

(21) Appl. No.: 15/516,101

(22) PCT Filed: Nov. 25, 2015

(86) PCT No.: PCT/JP2015/083122
§ 371 (c)(1),
(2) Date: Mar. 31, 2017

(87) PCT Pub. No.: WO2016/098547
PCT Pub. Date: Jun. 23, 2016

(65) Prior Publication Data
US 2017/0316193 A1    Nov. 2, 2017

(30) Foreign Application Priority Data
Dec. 17, 2014  (JP) .................. 2014-255531

(51) Int. Cl.
*G06K 9/00* (2006.01)
*G06F 21/32* (2013.01)
(Continued)

(52) U.S. Cl.
CPC .......... *G06F 21/32* (2013.01); *G06K 9/00597* (2013.01); *G06K 9/00899* (2013.01);
(Continued)

(58) Field of Classification Search
CPC .......... G06F 21/32; G06F 21/31; H04N 7/188; H04N 7/157; G06K 9/00899;
(Continued)

(56) References Cited

U.S. PATENT DOCUMENTS

| 9,898,610 B1* | 2/2018 | Hadsall ............... G06F 21/6245 |
| 2010/0157099 A1* | 6/2010 | Nakai ................ H04N 5/23219 |
| | | 348/231.99 |

(Continued)

FOREIGN PATENT DOCUMENTS

| JP | 2002-325238 A | 11/2002 |
| JP | 2007-300562 A | 11/2007 |

(Continued)

*Primary Examiner* — Jon Chang
(74) *Attorney, Agent, or Firm* — Metrolexis Law Group, PLLC

(57) ABSTRACT

A system may include a sensing device and an application device. The sensing device includes an imaging device, an image processing unit that detects a whole or part of a person from an image captured with the imaging device as a sensing target and extracts information on the detected sensing target, and a wireless communication unit that transmits the sensing result including the information extracted by the image processing unit through wireless communication. The application device includes a communication unit that receives the sensing result from the sensing device and an application processing unit that performs processing using information included in the sensing result received by the communication unit. The information transmitted from the sensing device as the sensing result includes neither a person's image nor information that can directly identify an individual.

13 Claims, 8 Drawing Sheets

(51) Int. Cl.
 *H04N 7/18* (2006.01)
 *H04N 7/15* (2006.01)
 *G06F 21/31* (2013.01)

(52) U.S. Cl.
 CPC .............. *H04N 7/188* (2013.01); *G06F 21/31* (2013.01); *G06K 9/00221* (2013.01); *G06K 9/00268* (2013.01); *H04N 7/157* (2013.01)

(58) Field of Classification Search
 CPC ........... G06K 9/00597; G06K 9/00268; G06K 9/00221; G06K 9/00302; G06T 13/40
 See application file for complete search history.

(56) References Cited

U.S. PATENT DOCUMENTS

2014/0218459 A1* 8/2014 Wenlong ............ H04N 21/4223
 348/14.01
2014/0310803 A1 10/2014 Irie

FOREIGN PATENT DOCUMENTS

| | | | |
|---|---|---|---|
| JP | 2010-239393 A | 10/2010 | |
| JP | 2014-206932 A | 10/2014 | |

\* cited by examiner

FIG. 4A

Sensing result   2014.12.1 15:10:30
[The number of faces] = 2

[Face 1] = {
    [Position coordinate of face
            rectangle] = (30,60/60,90)
    [Sexuality] = (Male)
    [Age] = (30)
    [Face orientation] = (Rightward 30)
    [Visual line orientation] = (Rightward 30,downward10)
    [Eye shutting level] = (Right eye 200,left eye 250)
    [Expression] = (Delight 70)
    [Smile level] = (65)
}

[Face 2] = {
    ⋮
}

FIG. 4B

Sensing result   2014.12.1 15:10:30
[The number of faces] = 2

[Face 1] = {
    [Smile level] = 65
}

[Face 2] = {
    [Smile level] = 88
}

FIG. 6

| Item | State | Virtual face data |
|---|---|---|
| Smile | Smile level 0~30 | egao00.gif |
| | Smile level 31~60 | egao01.gif |
| | Smile level 61~80 | egao02.gif |
| | Smile level 81~100 | egao03.gif |
| Face orientation | Facing front | normal.gif |
| | Upward | up.gif |
| | Downward | down.gif |
| | Rightward | right.gif |
| ... | ... | ... |

IMAGE SENSING SYSTEM

TECHNICAL FIELD

The present invention relates to a technology of acquiring information on a human or a face from an image photographed with an imaging device.

BACKGROUND ART

A technology called image sensing has been put into practical use. The image sensing means a technology of performing detection of a face, a human body, and a person's hand, personal identification, and estimation of expression, age, a visual line, and a face orientation by analyzing the image photographed with the imaging device. For example, this kind of technology is applied to devices of various fields such as a face detection function of a digital camera, a face authentication function of a monitoring camera, and personal authentication and a visual line input application in a smartphone (for example, Patent Document).

PRIOR ART DOCUMENT

Patent Document

Patent Document 1: Japanese Patent Application Publication No. 2014-206932

SUMMARY OF THE INVENTION

Problems to be Solved by the Invention

Conventionally, an image sensing module is generally provided in a form in which the image sensing module is built in a device using the image sensing module (hereinafter, referred to as a "built-in type"). On the other hand, the inventors are studying a device having a new form (hereinafter, referred to as an "independent type") in which only an image sensing function becomes independent. That is, a dedicated device (hereinafter, referred to as a "sensing device") constructed with an imaging device and an image processing module to specialize the image sensing is independent of a device (such as a smartphone, a PC, a household electric appliance, and an industrial apparatus; hereinafter, referred to as an "application device") using a sensing result, and wireless communication is used in data transfer between the sensing device and the application device. A new usage form or a new value can be provided using the independent type sensing device such that an application using advanced image sensing can easily be performed in the smartphone, such that the sensing result of one sensing device can be received by plural application devices, and such that a function in which the image sensing is used can be mounted even on a device not including an imaging device or a device including a low-speed processor.

For a configuration in which the sensing result is transmitted and received between the devices, it is necessary to sufficiently consider leakage of personal information or use of the personal information for other purposes. This is because the data, such as a face image, which can identify an individual, possibly corresponds to the "personal information". For example, it is conceivable that a strong encrypted communication protocol is used between the sensing device and the application device as a measure against the problem. However, it is undesirable that a resource on the application device is consumed for the purpose of encryption and decryption. The sensing result cannot be used in a device incompatible with the encrypted communication protocol, which results in an obstruction of wide spread of the independent type sensing device. Because a risk of the information leakage due to false transmission or communication interception is not eliminated even if the information is encrypted, it is difficult to wipe out a resistance of a user who is highly interested in handing of the personal information.

An object of the present invention is to provide a technology of establishing both the leakage prevention of the personal information and usability improvement of the sensing result in the system in which the sensing device performing the image sensing and the application device using the sensing result are separately provided.

Means For Solving The Problem

In order to achieve the above object, in the present invention, an image sensing system is constructed with a sensing device and an application device, which are separately provided. The sensing device includes an imaging device, an image processing unit that detects a whole or part of a person from an image captured with the imaging device as a sensing target and extracts information on the detected sensing target, and a wireless communication unit that transmits a sensing result including the information extracted by the image processing unit through wireless communication. The application device includes a communication unit that receives the sensing result from the sensing device and an application processing unit that performs processing using information included in the sensing result received by the communication unit. At this point, the information transmitted from the sensing device as the sensing result includes neither the image captured with the imaging device nor information that can directly identify an individual of the detected sensing target.

In the configuration, since the information transmitted from the sensing device to the application device does not include the image in which a person is photographed or the information that can identify the individual, the leakage of the personal information is not generated even if the false transmission or communication interception occurs. Accordingly, it is not necessary to provide advanced security in the communication between the sensing device and the application device, and communication modules of both the sensing device and the application device can be simplified. Because a device having a low throughput or a small resource can constitute the application device when an overhead necessary for the communication is reduced, use opportunities of the sensing device and the sensing result are expanded, thereby generating an advantage that spread of the independent type sensing device can be promoted. In the present invention, secure communication such as encryption may also be used in order to enhance safety of the information transmission and reception. That is, the present invention can widely be applied from a low-security communication system to a high-security communication system.

For example, "a whole or part of a person" constituting the sensing target is a whole body of a person, a half body of a person, a person's face, and a person's hand. Preferably, a person's face is detected as the sensing target, and information (face information) on a face is extracted.

Preferably the information received from the sensing device as the sensing result includes face state information expressing a state of the detected face, and the application processing unit performs processing of outputting the state of the detected face on a display device based on the face state information. In the configuration, the sensing result of the sensing device can be checked on the application device side, and user convenience of the application device can be enhanced.

As used herein, the "face state" means a state (how the face is photographed in the image) of the detected face in the image. A kind (such as serious look, delight, surprise, anger, and sadness) of the expression, a smile level, a face orientation, a visual line direction, and eye shutting can be cited as an example of the face state. The face state information transmitted from the sensing device as the sensing result is data in which the face state is described using a numerical value (score) or a code, for example, "expression=delight 50", "smile level=30", and "face orientation=rightward 30".

When the face state is output on the application device side, user friendliness is extremely low only by simply displaying the numerical value or the code. This is because it is difficult for the user to understand the face state only from the numerical value or the code and to check whether the sensing result is proper. In the case that an original image used in the sensing exists like the conventional built-in type device, the sensing result can easily be checked by simultaneously displaying the original image and the sensing result. On the other hand, in the independent type device like the present invention, because the original image cannot be used on the application device side, a special device is required to improve the user friendliness.

Preferably the application device further includes a storage in which data of a virtual face is previously stored, the virtual face being able to express a plurality of kinds of face states using an animation, an avatar, or a face image. At this point, the application processing unit expresses the state of the detected face by outputting the virtual face to the display device according to the face state information received from the sensing device. In the configuration, the face state is expressed by the virtual face using the animation, the avatar, or the face image (instead of the original image), so that the user can intuitively and instantly check the sensing result. The above configuration is useful for a configuration in which the original image used in the sensing cannot be used, as in the present invention.

Preferably the application processing unit changes the virtual face output to the display device according to the change of the face state information sequentially received from the sensing device. In the configuration, the change of the face state of the sensing target can easily be checked in real time by looking at the virtual face displayed on the application device side.

Preferably the face state information includes smile level information indicating a smile level of the detected face, and the application processing unit outputs the virtual face, which expresses a smile corresponding to the smile level received from the sensing device, to the display device. In the configuration, whether the sensing target smiles or the smile level can easily be checked by looking at the expression of the virtual face displayed on the application device side.

The smile level determination technology can be expected to be applied to various applications. For example, preferably the application processing unit provides a determination application in which the smile level is used, and the determination application monitors a change of the smile level sequentially received from the sensing device, and determines whether the smile level exceeds a threshold within a time limit.

The present invention can be understood as an application device or a sensing device having at least a part of the above configuration and function or an image sensing system constructed with the application device and the sensing device. The present invention can also be understood as an image sensing method including at least a part of the above pieces of processing, a program that causes a computer to perform the method, or a computer-readable recording medium in which the program is recorded in a non-transitory manner. A combination of the above configurations and pieces of processing can constitute the present invention as long as a technical inconsistency is not generated.

Effect of the Invention

Accordingly, in the present invention, both the leakage prevention of the personal information and the usability improvement of the sensing result can be established in the system in which the sensing device performing the image sensing and the application device using the sensing result are separately provided.

BRIEF DESCRIPTION OF THE DRAWINGS

FIGS. 4A and 4B are views illustrating an example of a sensing result;

FIG. 6 is a view illustrating an example of virtual face data used in the determination application;

MODE FOR CARRYING OUT THE INVENTION (Entire Configuration of System)

Figure 1:
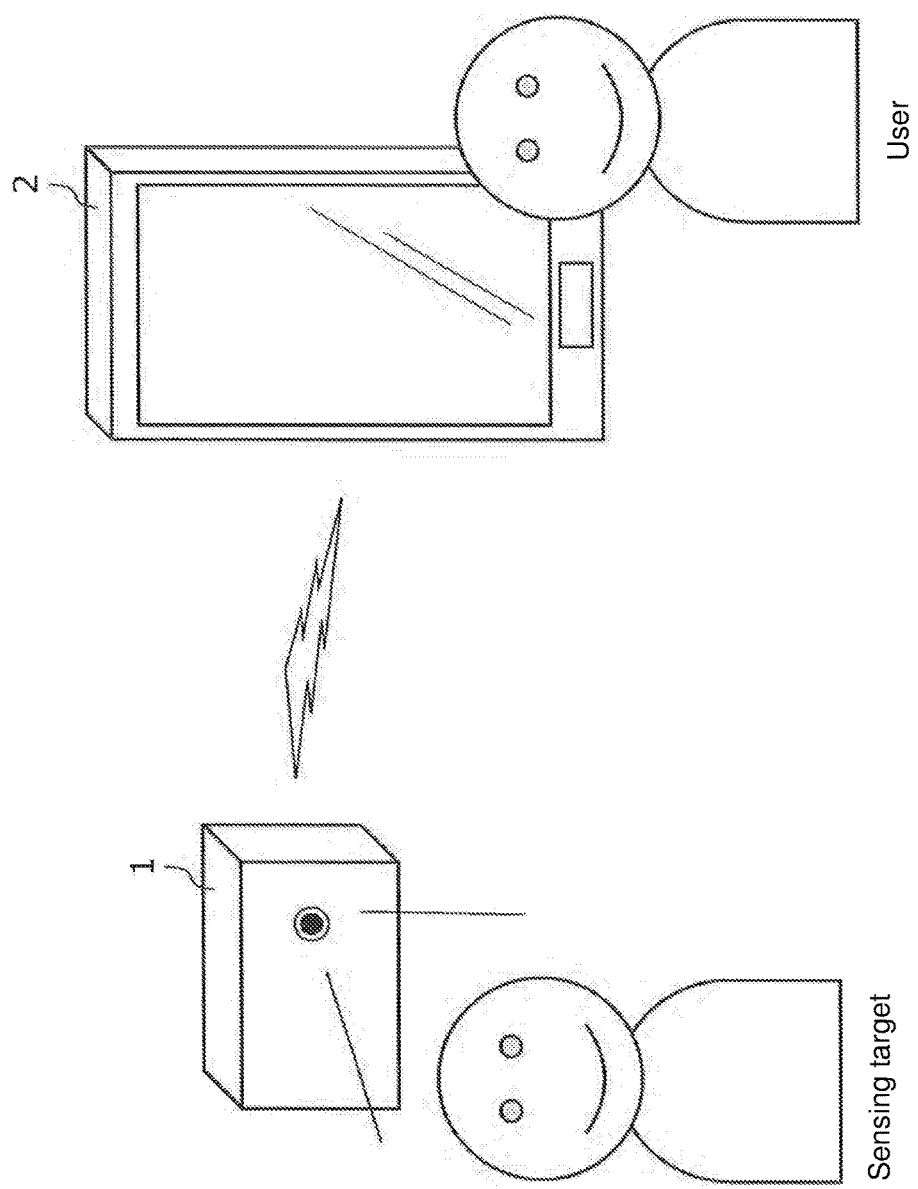
FIG. 1 is a view illustrating a configuration example of an image sensing system according to an embodiment of the present invention.

FIG. 1 is a view illustrating a configuration example of an image sensing system according to an embodiment of the present invention. In the image sensing system, various pieces of information on a sensing target (such as a person's face) are acquired by image sensing. Although a sensing target and a system user are separately illustrated in FIG. 1, the user per se may become the sensing target.

The image sensing system of the embodiment is constructed with two kinds of devices, namely, a sensing device 1 and an application device 2. The sensing device 1 is an independent type device dedicated to the image sensing, and has a function of providing a sensing result to an external device such as the application device 2. On the other hand, the sensing result acquired from the sensing device 1 is used in the application device 2. Data transmission and reception between the sensing device 1 and the application device 2 are performed by wireless communication such as Bluetooth, Wi-Fi, and infrared communication. Preferably the communication is directly conducted between the sensing device 1 and application device 2 from the view point of security and communication processing. Alternatively, the communication may be conducted between the sensing device 1 and the application device 2 through other network devices such as a wireless LAN router and an access point or the Internet. Alternatively, the sensing device 1 and the application device 2 are connected by a USB cable to perform the data transmission and reception by wired communication.

Although a smartphone is illustrated as an example of the application device 2 in FIG. 1, various kinds of devices, such as a personal computer, a tablet terminal, a mobile phone, a game machine, a household electric appliance, and an industrial apparatus, which having a wireless communication function, can constitute the application device 2. FIG. 1 illustrates one-on-one system configuration including one sensing device 1 and one application device 2. Alternatively, system configurations such as one sensing device 1 and plural application devices 2, plural sensing devices 1 and one application device 2, and plural sensing devices 1 and plural application devices 2 may be adopted.

(Sensing Device)

Figure 2:
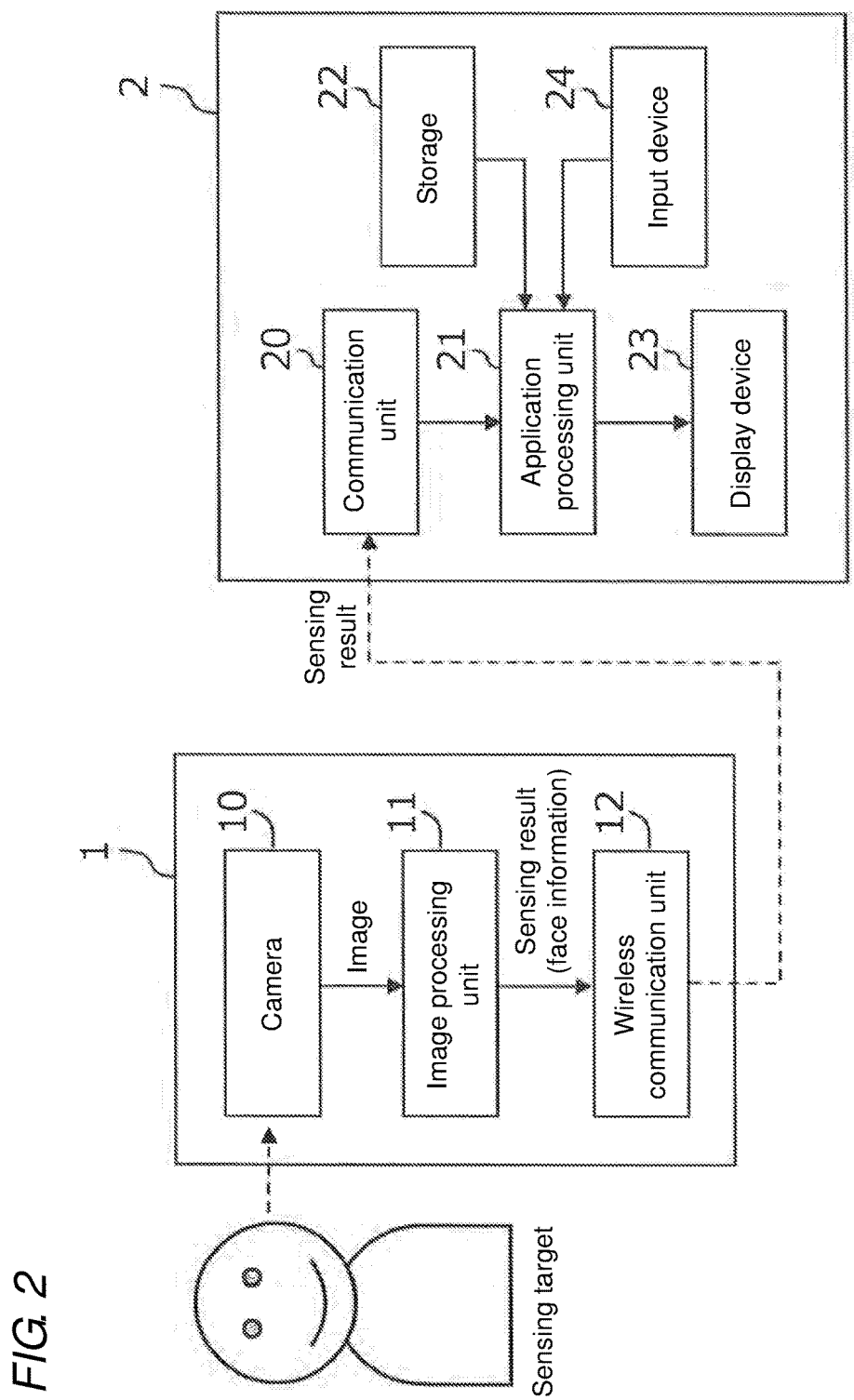
FIG. 2 is a view illustrating internal configurations of a sensing device and an application device.

FIG. 2 schematically illustrates an internal configuration of the sensing device 1.

The sensing device 1 mainly includes an imaging device 10, an image processing unit 11, and a wireless communication unit 12. The imaging device 10 is an imaging unit that captures a color or monochrome image. For example, the imaging device 10 is constructed with a lens integrated CCD module. The image processing unit 11 has a function of detecting a whole or part of a person as the sensing target from the image captured by the imaging device 10, and of extracting information on the detected sensing target. The wireless communication unit 12 transmits and receives data to and from the application device 2. For example, the wireless communication unit 12 is constructed with a Bluetooth communication module or a Wi-Fi communication module.

In the embodiment, the image processing unit 11 is constructed with a CPU (Central Processing Unit), a memory, and a ROM (Read-Only Memory) in which an image sensing processing program is stored. During operation of the sensing device 1, the CPU reads the necessary program from the ROM and executes the program, thereby implementing the function of the image processing unit 11. However, the configuration of the embodiment is illustrated only by way of example. Alternatively, for example, an image processor dedicated to image sensing processing may be provided separately from the CPU controlling the imaging device 10 and the wireless communication unit 12.

Examples of the image sensing processing executable by image processing unit 11 include face detection, human body detection, hand detection, sexuality estimation, age estimation, visual line estimation, face orientation estimation, expression estimation, smile level determination, and eye shutting estimation. The face detection means processing of detecting the person's face from the image. The human body detection means processing of detecting a whole body of a person or an upper half of the body from the image, and the hand detection means processing of detecting a person's hand from the image. The sexuality estimation means processing of estimating sexuality of the person (face) detected from the image, and the age estimation means processing of estimating age of the person (face) detected from the image. The visual line estimation means processing of estimating a visual line direction of the face detected from the image, and the face orientation estimation means processing of estimating an orientation (such as facing front, upward, downward, rightward, and leftward) of the face detected from the image. The expression estimation means processing of estimating expression (classification between satisfaction and dissatisfaction and classification among five expressions of serious look, delight, surprise, anger, and sadness) of the face detected from the image. The smile level determination means processing of determining a smile level of the face detected from the image. The eye shutting estimation means processing of determining whether eyes of the face detected from the image are opened or closed. Because a well-known algorithm can be used in these pieces of processing, the detailed description is omitted.

(Application Device)

FIG. 2 schematically illustrates an internal configuration of the application device 2.

The application device 2 mainly includes a communication unit 20, an application processing unit 21, a storage 22, a display device 23, and an input device 24. The communication unit 20 transmits and receives the data to and from the sensing device 1. For example, the communication unit 20 is constructed with a Bluetooth communication module or a Wi-Fi communication module. The application processing unit 21 performs processing in which information included in the sensing result received from the sensing device 1 is used. The storage 22 is a unit in which various pieces of data used in the application processing unit 21 are stored. For example, the data of a virtual face used in a later-described smile level determination application is stored in the storage 22. The display device 23 displays acquired face information and the processing result of the application device 2. The input device 24 is used to input the information to the application device 2.

In the embodiment, a smartphone is used as the application device 2. Accordingly, the communication unit 20 is constructed with a built-in wireless communication module, the storage 22 is constructed with a built-in memory or a flash memory, and the display device 23 and the input device 24 are constructed with a touch panel display. The application processing unit 21 is constructed with a CPU (processor), a memory, and an application program (also simply referred to as an "application") installed on the application device 2. The application device 2 can provide various functions, in which the face information is used, by changing or adding the application.

(System Operation)

Figure 3:
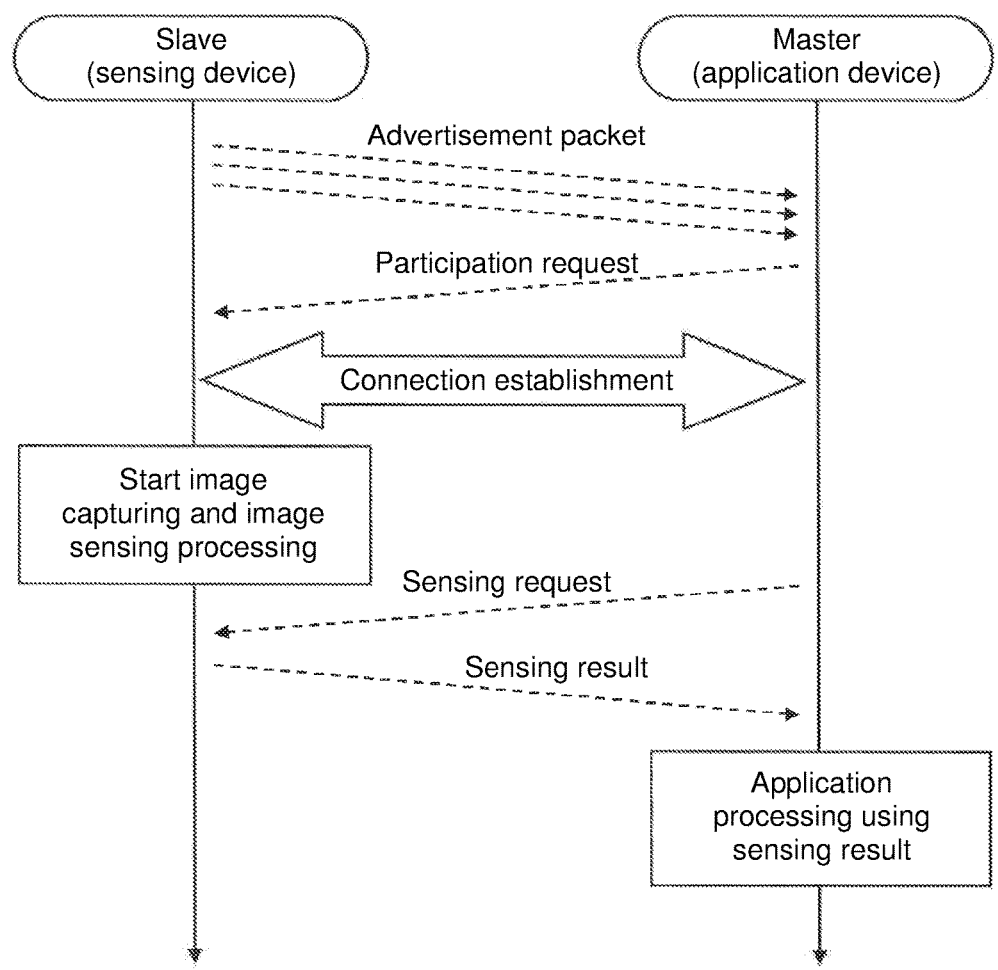
FIG. 3 is a view illustrating a procedure of cooperation and data communication between the sensing device and the application device.

The operation of the image sensing system, particularly cooperation and data communication between the sensing device 1 and the application device 2 will be described with reference to FIG. 3.

At first, connection processing is performed between the wireless communication unit 12 of the sensing device 1 and the communication unit 20 of the application device 2 in order to enable the data communication. FIG. 3 illustrates a procedure for establishing Bluetooth LE in which the application device 2 becomes a master (central) while the sensing device 1 becomes a slave (peripheral) as an example.

When the sensing device 1 is powered on, the slave (sensing device 1) immediately makes a transition to a connection request state, and periodically (for example, at 100-millisecond intervals) broadcasts an advertisement packet to inform the neighborhood of own existence. On the other hand, the master (application device 2) makes a transition to a connection search state after start-up, and waits for the reception of the advertisement packet. When receiving the advertisement packet from the slave existing near the master, the master determines whether the slave is a connectable device based on information included in the advertisement packet. When finding the connectable device, the master transmits a participation request to make a transition to a connection state. When receiving the participation request from the master, the slave makes the transition to the connection state. Therefore, the connection is established between the master and the slave, and packet communication can be conducted using a data channel.

In the connection state, the sensing device 1 captures the image from the imaging device 10, and the image processing unit 11 starts the image sensing processing. The image capturing and the image sensing processing are periodically (for example, at 1-second intervals) performed until disconnection. In the image data and the sensing result data, the older data is sequentially deleted (discarded) while the last pieces of data for several frames are left in the memory.

The application device 2 can transmit a sensing request to the sensing device 1 at any time. When receiving the sensing request from the application device 2, the sensing device 1 reads the latest sensing result data from the memory, and transmits the sensing result data to the application device 2. Therefore, the application device 2 can substantially acquire the sensing target information in real time when necessary, and perform application processing using the sensing target information.

For example, processing results of the face detection, the human body detection, the hand detection, the sexuality estimation, the age estimation, the visual line estimation, the face orientation estimation, the expression estimation, the smile level determination, and the eye shutting estimation can be acquired as the sensing target information. For example, the number of detected pieces, a rectangular position coordinate (upper-left and lower-right coordinates of a rectangle including the face, the human body, or the hand), a rectangular center coordinate, a rectangular size (the number of pixels), and detection reliability can be output as the results of the face detection, the human body detection, and the hand detection. For example, sexuality (male/female) and estimation reliability can be output as the result of the sexuality estimation. For example, age (numerical value), era (numerical range), and the estimation reliability can be output as the result of the age estimation. For example, a horizontal or vertical angle of the visual line and the estimation reliability can be output as the result of the visual line estimation. For example, the horizontal angle, the vertical angle, a tilt angle (rotation angle), and the estimation reliability can be output as the result of the face orientation estimation. For example, one of five expressions (serious look, delight, surprise, anger, and sadness) and its score (for example, 0 to 100), a level of the satisfaction (positive) or dissatisfaction (negative) can be output as the result of the expression estimation. The smile level (for example, score of 0 to 100) can be output as the result of the smile level determination. An opening level of each of the eyes (for example, closed state=0 to fully-opened state=score of 1000) can be output as the result of the eye shutting estimation.

FIG. 4A schematically illustrates an example of the sensing result transmitted from the sensing device 1. In the example of FIG. 4A, acquisition date and time of the sensing result, the number of faces detected from the image, and face information on each face are described in text. A character string surrounded by "[ ]" expresses a kind (item) of the face information, and a numerical value or a sign subsequent to "=" expresses a value of the face information. The sensing result in FIG. 4A shows that two faces are detected from the image, that "face 1" has upper-left and lower-right face rectangular XY-coordinates of (30,60) and (60,90), that the sexuality is male, that the age is 30 years old, that the face orientation is the rightward direction of 30 degrees, that the visual line orientation is the rightward direction of 30 degrees and the downward direction of 10 degrees, that the right and left eyes have the shutting levels of 200 and 250, respectively, the expression has the delight of 70%, and that the smile level has 65 points.

Thus, in the embodiment, only the data in which the information extracted from the image is digitized or coded is transmitted as the sensing result, but neither the image data nor information being able to directly identify the person in the image are transmitted to the outside. Accordingly, a personal information leakage risk can be minimized.

FIG. 4B illustrates an example of a subset of the sensing result. In the case that the side of the application device 2 needs not receive the pieces of information on all the items, only part of the face information can be acquired as illustrated in FIG. 4B by assigning the desired item in the sensing request. A communication load between the application device 2 and the sensing device 1 can be reduced when the control is performed such that only the necessary face information is acquired. The method is effectively adopted in the case that one-to-many communication or many-to-many communication is conducted or that the application device 2 has low throughput.

(Example of Determination Application in which Smile Level is Used)

Figure 5:
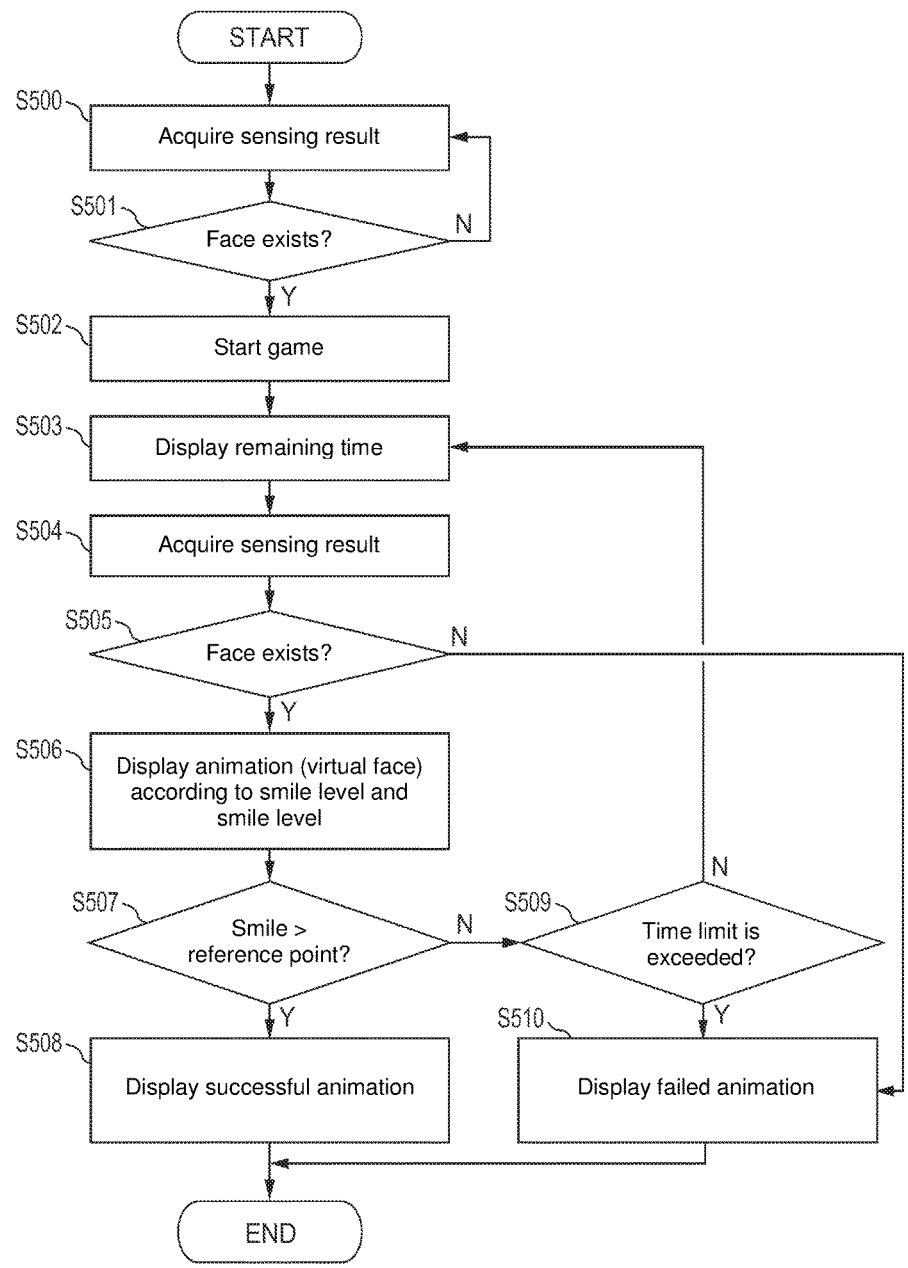
FIG. 5 is a view illustrating a processing flow of a determination application in which smile level is used.
Figure 7:
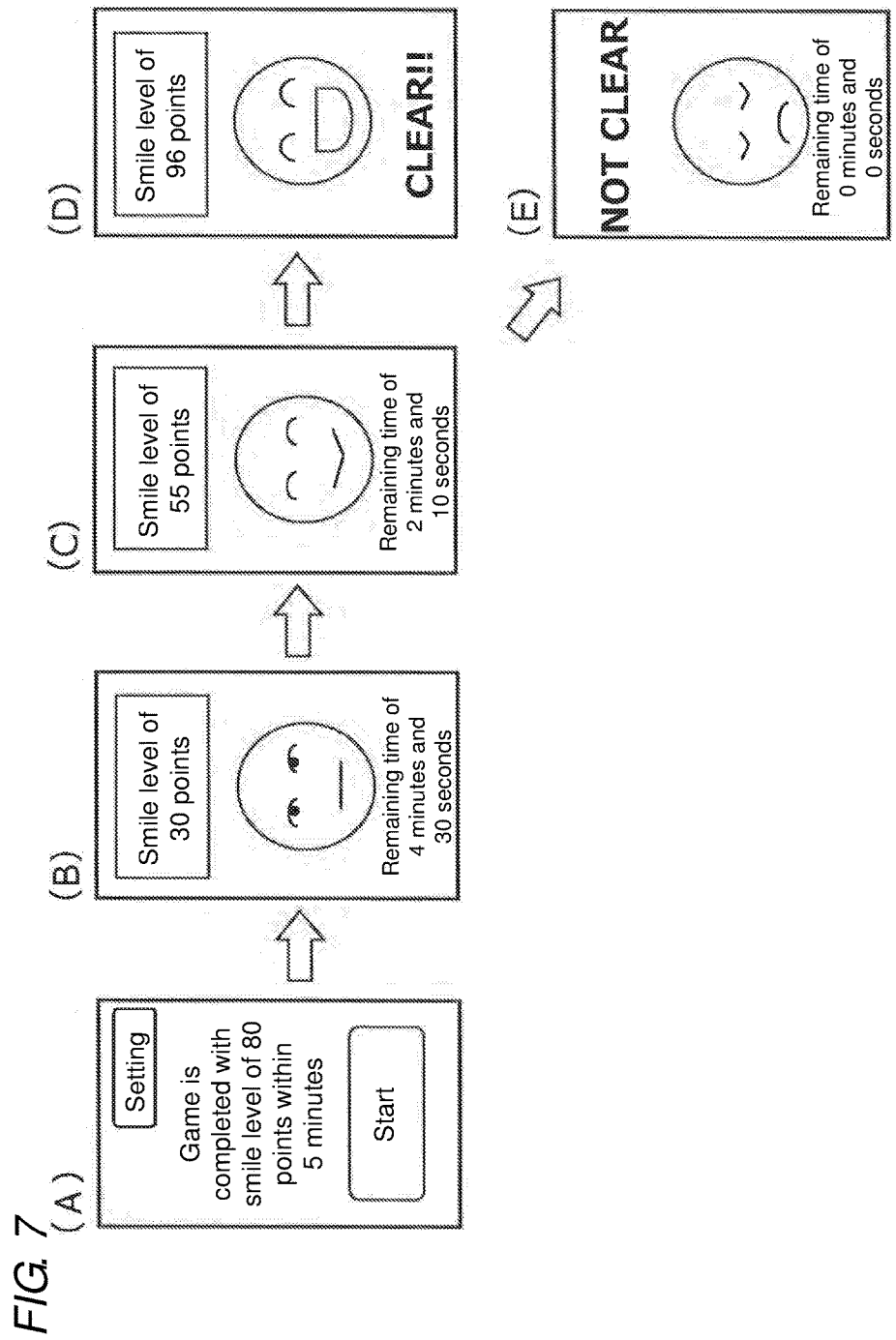
FIG. 7 is a view illustrating a screen transition of the determination application.

An example of the application provided by the application device 2 will be described below with reference to FIGS. 5 to 7. FIG. 5 illustrates a processing flow of the determination application in which the smile level is used, FIG. 6 illustrates an example of the virtual face data used in the determination application, and FIG. 7 is a screen transition diagram of the determination application.

When the determination application is started, the application processing unit 21 displays an initial screen in FIG. 7(A) on the display device 23. The determination application is a game application having a rule that a game is successful when the smile level exceeds a reference point (threshold) within a limit time. A start button and a setting button are displayed on an initial screen together with a description of a game rule. In an initial state, a time limit is set to 5 minutes, and the reference point for clear of the game is set to 80 points. However, the time limit and the reference point can be changed on a difficulty level setting screen that is displayed by tapping the setting button.

The flow in FIG. 5 is started when a user taps the start button. In Step S500, the application processing unit 21 acquires the sensing result from the sensing device 1 through the communication unit 20. When the face cannot be detected (N in Step S501), an error message that "the face is not found" is displayed to repeat the processing in Step S500. When the face of a game participant can be detected (Y in Step S501), the application processing unit 21 displays an animation "3, 2, 1, start!" on the display device 23 as a sign of the game start, and starts to count an elapsed time since the game start (Step S502). A remaining time of the game is displayed on the screen as illustrated in FIG. 7(B) (Step S503).

The application processing unit 21 periodically (for example, at 1-second intervals) acquires the sensing result from the sensing device 1 through the communication unit 20 (Step S504). When the face cannot be detected in the middle of the game (N in Step S505), the game is interrupted (Step S510). When the face can be detected (Y in Step S505), the application processing unit 21 extracts the data of the smile level from the sensing result, and displays the smile level (score) on the screen as illustrated in FIG. 7(B) (Step S506).

At this point, it is easily understood that the image (original image) of the game participant photographed with the sensing device 1 is displayed on the screen together with the smile level, because the actual expression of the game participant can be compared to the determination result of the application. However, in the system of the embodiment, the original image cannot be used on the side of the application device 2 in order to prevent the leakage of the personal information. Therefore, in the system of the embodiment, a virtual face is produced on the side of the application device 2 according to face state information included in the sensing result, and displayed on the screen instead of the original image.

As used herein, the virtual face is an image expressing the face state (such as the expression, the smile level, the visual line direction, and the face orientation). An illustration (line drawing) such as an animation and an avatar can be used as the virtual face, or a photograph image such as a face image can be used as the virtual face (for example, the face of the game participant is photographed by the side of the application device 2, and the virtual face may be produced using the face image of the game participant). Various kinds of pieces of virtual face data are previously registered in the storage 22 in order to be able to express plural kinds of face states. For example, FIG. 6 illustrates pieces of virtual face data "egao00.gif" to "egao03.gif" for expressing the smiles of four stages and pieces of virtual face data "normal.gif", "up.gif", . . . for expressing plural face orientations.

For example, in the case that the smile level has a score of 30 points, "egao00.gif" is read from the storage 22 and displayed on the screen (see FIG. 7(B)). In the case that the smile level has a score of 55 points, "egao01.gif" is read and displayed on the screen (see FIG. 7(C)). Thus, an easy-to-understand interface through which the smile level of the game participant is intuitively and instantly checked can be provided by displaying not only the score of the smile level but also the virtual face corresponding to the smile level.

Then, the application processing unit 21 compares the smile level to the reference point (Step S507). When the smile level is higher the reference point, a successful animation "CLEAR!!" is displayed on the screen as illustrated in FIG. 7(D) (Step S508), and the game is ended. On the other hand, when the smile level is lower than the reference point (N in Step S507), the flow returns to Step S503, and the processing is repeated until the smile level is higher than the reference point. When the smile level cannot exceed the reference point within the time limit (Y in Step S509), a failed animation "NOT CLEAR" is displayed on the screen as illustrated in FIG. 7(E) (Step S510), and the game is ended.

(Advantage of the Embodiment)

The configuration of the embodiment has the following advantages. Because the information transmitted from the sensing device 1 to the application device 2 does not include the image in which the person is photographed or the information that can directly identify an individual, the leakage of the personal information is not generated even if false transmission or communication interception occurs. Accordingly, it is not necessary to provide advanced security in the communication between the sensing device 1 and the application device 2, and communication modules of both the sensing device 1 and the application device 2 can be simplified. When an overhead necessary for the communication is reduced, a device, such as a microcomputer built in household electronics, which has a low processing ability or a small resource, can constitute the application device 2. When an application range of the application device 2 spreads, use opportunities of the sensing device 1 and the sensing result are expanded, thereby generating an advantage that the spread of the sensing device 1 can be promoted.

When the state of the sensing target is displayed on the screen like the application device 2 of the embodiment, the sensing result of the sensing device 1 can be checked on the side of the application device 2, and user convenience can be enhanced. At this point, when the face state is expressed using the animation, the avatar, or the virtual face of the face image like the determination application, the intuitive comprehension of the sensing result can be facilitated to improve user friendliness.

(Other Application Examples)

The smile level determination technology can be applied to various applications. An example will be described below.

Figure 8B:
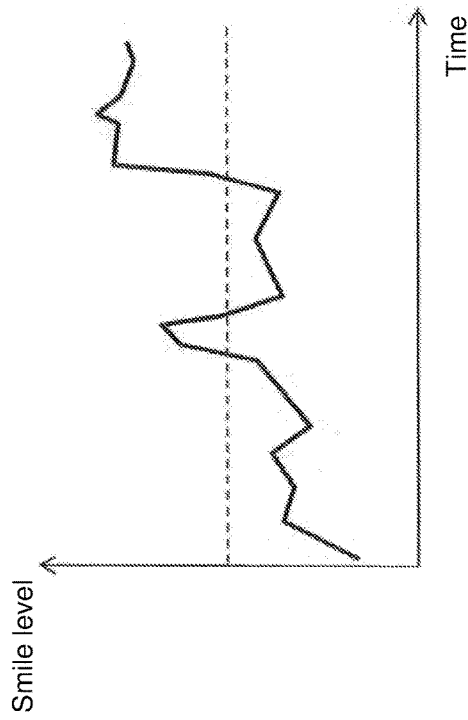
FIGS. 8A and 8B are views illustrating operation of an application recording time series data of the smile level.
Figure 8A:
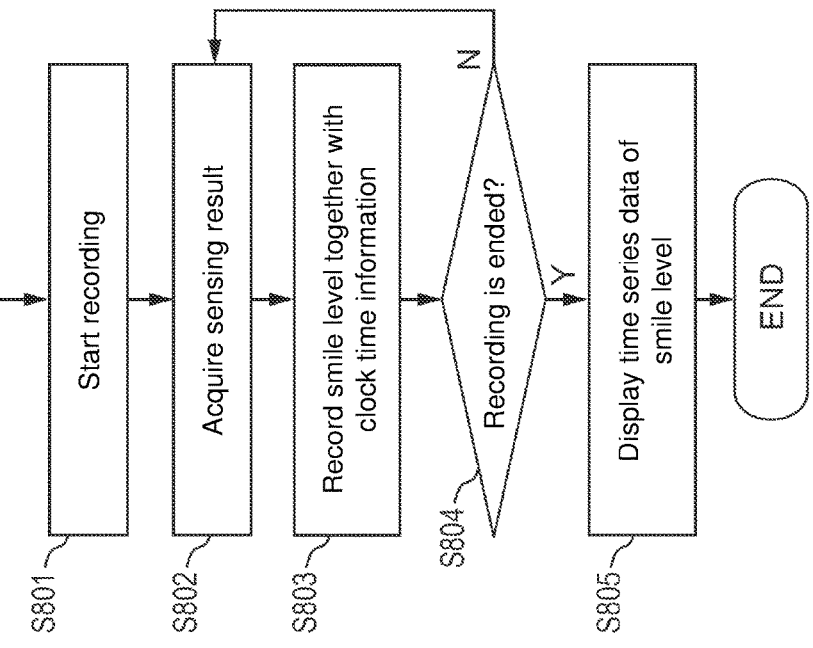

FIG. 8A is a flow chart illustrating an application recording time series data of the smile level.

When the user issues an instruction of "recording start" to the application (Step S801), the application processing unit 21 acquires the sensing result from the sensing device 1 (Step S802), and records the score of the smile level in the storage 22 together with clock time information (Step S803). The smile level is periodically (for example, at 1-second intervals) acquired and recorded until the user issues an instruction of "recording end" or the recording reaches a predetermined recording time (Step S804). When the recording is ended, the application processing unit 21 displays a graph of the recorded time series data of the smile level on the display device 23 (Step S805).

FIG. 8B illustrates an example of the time series data of the smile level displayed on the display device 23. A transition of the smile level of the person can easily be understood by looking at the graph of the time series data. In the example of FIG. 8B, the smile level exceeds the threshold (broken line) twice.

The application in FIGS. 8A and 8B can be used as a marking meter (laughter meter) that records or marks interest of a comedian or a comedy show. For example, the sensing device 1 is installed so as to photograph the faces of audiences (markers), and the smile level of the audiences are recorded with the application device 2 while the comedian (performer) performs live. When the time series data of the smile level is obtained as illustrated in FIG. 8B, the interest of the performer or a program can be evaluated with an objective index. Accordingly, for example, in a contest in which plural performers competes with one another, the performers contend for a victory by the highest smile level recorded in the marking meter or a length of the time the smile level exceeds the threshold, or a victory is decided based on whether the performer gains the score closer to the previously-specified smile level. Because the transition of the smile level is monitored in real time, for example, who makes the audience laugh first can be contested by the comparison of the time the smile level exceeds the threshold. The plural performers form a team, and a match between teams can be decided by a total or an average of the smile levels.

The configuration of the embodiment is described as only a specific example of the present invention, but the scope of the present invention is not limited to the configuration of the embodiment. Various specific configurations can be adopted without departing from the scope of the technical concept of the present invention.

DESCRIPTION OF SYMBOLS

1: sensing device
2: application device
10: imaging device
11: image processing unit
12: wireless communication unit
20: communication unit
21: application processing unit
22: storage
23: display device
24: input device

The invention claimed is:

1. An image sensing system comprising:
an image sensing communication device comprising
an image capture device,
a first wireless communication transceiver,
an image processing unit comprising a first processor configured with a first program to perform operations comprising detecting a whole or part of a person from an image captured with the image capture device as a sensing target and extracting information on the detected sensing target, the first wireless communication transceiver transmitting a sensing result including the information extracted by the image processing unit through wireless communication; and
an application processing device comprising:
a second wireless communication transceiver receiving the sensing result from the first wireless communication transceiver, and
an application processing unit comprising a second processor configured with a second program to perform operations comprising performing processing using information included in the sensing result received by the second wireless communication transceiver,
wherein:
the information transmitted from the image sensing communication device as the sensing result comprises face state information and excludes the image captured with the image capture device and information that can directly identify an individual of the detected sensing target; and
the second processor is configured to perform operations comprising:
comparing a value associated with the face state information with a reference value; and
displaying a message on a display of the application processing device based on the comparison of the value associated with the face state information and the reference value.

2. An image sensing communication device comprising:
an image capture device;
an image processing unit comprising a processor configured with a program to perform operations comprising detecting a whole or part of a person from an image captured with the image capture device as a sensing target and extracting information on the detected sensing target; and
a wireless communication transceiver configured to transmit a sensing result including the information extracted by the image processing unit through wireless communication,
wherein the image sensing communication device provides the sensing result to an application device comprising an application configured to perform processing using the sensing result,
the information transmitted as the sensing result comprises face state information and excludes the image captured with the image capture device and information that can directly identify an individual of the detected sensing target, the face state information comprising a value that is compared in the application device with a reference value, the application device displaying a message on a display based on the comparison of the value of the face state information and the reference value.

3. An application processing device comprising:
a wireless communication transceiver configured to receive a sensing result from an image sensing communication device, the sensing result comprising information associated with a whole or part of a person detected from an image captured with an image capture device of the image sensing communication device as a sensing target, the information comprising information extracted on the detected sensing target, the sensing result including the information received through wireless communication; and
an application processing unit comprising a processor configured with a program to perform operations comprising performing processing using the information included in the sensing result received by the wireless communication transceiver,
wherein:
the received information comprises face state information and excludes the image captured with the image capture device of the image sensing communication device and information that can directly identify an individual of the detected sensing target; and
the processor is configured to perform operations further comprising:
comparing a value associated with the face state information with a reference value; and
displaying a message on a display device of the application processing device based on the comparison of the value associated with the face state information and the reference value.

4. The application processing device according to claim 3, wherein the sensing target comprises a face of a person.

5. The application processing device according to claim 4, wherein the face state information expresses a state of the face of the person, and
the processor of the application processing unit is configured with the program to perform operations comprising processing of outputting the state of the face of the person on the display device based on the face state information.

6. The application processing device according to claim 5, further comprising a storage in which data of a virtual face is previously stored, the virtual face capable of expressing a plurality of kinds of face states using an animation, an avatar, or a face image,
wherein the application processing unit expresses the state of the face of the person by outputting the virtual face to the display device according to the face state information received from the image sensing communication device.

7. The application processing device according to claim 6, wherein the application processing unit changes the virtual face output to the display device according to the change of the face state information sequentially received from the image sensing communication device.

8. The application processing device according to claim 7, wherein the face state information includes smile level information indicating a smile level of the face of the person, and the application processing unit outputs the virtual face, which expresses a smile corresponding to the smile level received from the image sensing communication device, to the display device.

9. The application processing device according to claim 8, wherein the application processing unit provides a determination application in which the smile level is used, and the determination application monitors a change of the smile level sequentially received from the image sensing communication device, and determines whether the smile level exceeds a threshold within a time limit.

10. The application processing device according to claim 6, wherein the face state information includes smile level information indicating a smile level of the face of the person, and the application processing unit outputs the virtual face, which expresses a smile corresponding to the smile level received from the image sensing communication device, to the display device.

11. The application processing device according to claim 10, wherein the application processing unit provides a determination application in which the smile level is used, and the determination application monitors a change of the smile level sequentially received from the image sensing communication device, and determines whether the smile level exceeds a threshold within a time limit.

12. A non-transitory computer readable medium having instructions stored thereon, which when executed, cause a processor of an image sensing communication device to perform operations comprising:

detecting a whole or part of a person from an image capture with an image capture device as a sensing target and extracting information on the detected sensing target; and transmitting a sensing result including the extracted information to an application device comprising an application configured to perform processing using the sensing result;

wherein the information transmitted as the sensing result comprises face state information and excludes the image captured with the image capture device and information that can directly identify an individual of the detected sensing target, the face state information comprising a value that is compared in the application device with a reference value, the application device displaying a message on a display based on the comparison of the value of the face state information and the reference value.

13. A non-transitory computer readable medium having instructions stored thereon, which when executed, cause a processor of an application processing device to perform operations comprising:

receiving a sensing result from an image sensing communication device, the sensing result comprising information associated with a whole or part of a person detected from an image captured with an image capture device of the image sensing communication device as a sensing target, the information comprising information extracted on the detected sensing target, the sensing result including the information received through wireless communication; and performing processing using the information included in the received sensing result;

wherein:

the received information comprises face state information and excludes the image captured with the image capture device of the image sensing communication device and information that can directly identify an individual of the detected sensing target; and the instructions further cause the processor to perform operations comprising:

comparing a value associated with the face state information with a reference value; and displaying a message on a display device of the application processing device based on the comparison of the value associated with the face state information and the reference value.

* * * * *